United States Patent [19]
Takahashi

[11] Patent Number: 5,326,544
[45] Date of Patent: Jul. 5, 1994

[54] COMBINATION STERILIZED HOT-WATER PRODUCER AND INCINERATION SYSTEM

[75] Inventor: Yoshishige Takahashi, Tokyo, Japan
[73] Assignee: Kabushiki Kaisha Oze, Japan
[21] Appl. No.: 789,873
[22] Filed: Nov. 12, 1991

[30] Foreign Application Priority Data

Dec. 17, 1990 [JP] Japan .................. 2-417737

[51] Int. Cl.$^5$ .............................................. A61L 2/04
[52] U.S. Cl. ................... 422/295; 422/307; 423/270; 122/2; 122/7 R
[58] Field of Search ........... 422/307, 295; 122/2, 122/7 R; 423/220

[56] References Cited

U.S. PATENT DOCUMENTS

| | | | |
|---|---|---|---|
| 551,850 | 12/1895 | Chesebrough | 122/2 |
| 749,269 | 1/1904 | Decarie | 122/2 |
| 763,410 | 6/1904 | Long | 122/2 |
| 778,960 | 1/1905 | Erikson | 122/2 |
| 1,284,971 | 11/1918 | Andrews | 122/2 |
| 2,045,115 | 6/1936 | Allen et al. | 122/2 |
| 3,682,139 | 8/1972 | Sahm | 122/2 |
| 4,690,697 | 9/1987 | Schwartz et al. | 423/220 |
| 4,896,496 | 1/1990 | Zervos | 122/7 R |
| 5,134,944 | 8/1992 | Keller et al. | 122/2 |

*Primary Examiner*—Timothy M. McMahon

[57] ABSTRACT

The heat from garbage upon incineration and solar heat can be effectively used to make sterilized hot water economically. A sterilized hot-water generator is provided with upper, intermediate and lower tanks in communication with each other. The lower tank includes a combustion chamber which is in communication with heating chambers housed centrally within the upper and intermediate tanks. A solar heat hot-water maker is attached to the front side of the sterilized hot-water generator. A sterilizer is located through the heating chambers in the upper and intermediate tanks to introduce the hot water in the upper tank into an associated sterilizing chamber for sterilization by heating. A fume removing tank is provided to dissolve, in water, fumes generated during combustion. Exhaust gases leaving the fume removing tank are fed to a reducing tank where they are reduced to oxygen, by plants, for example. The oxygen is then released into the atmosphere.

4 Claims, 1 Drawing Sheet

COMBINATION STERILIZED HOT-WATER PRODUCER AND INCINERATION SYSTEM

BACKGROUND OF THE INVENTION

1. Field of the Invention

This invention relates to a combination sterilized hot-water producer and incineration system capable of making effective use of the heat of burning garbage and solar heat.

2. Prior Art

In recent years, the amount of municipal garbage and waste has increased so much that they can no longer be disposed of by incineration systems now in operation, but instead must be buried in mountains or elsewhere. However, it is said that it is only a matter of time until it becomes no longer possible to continue such disposal practices. Garbage and waste, when buried in mountains or highlands, are carried through underground water to lowlands, forming toxic underground water which will remain for as long as several tens of years. So far, although garbage incinerators for domestic purposes have been commercially available, they can be used only for incineration of small garbage. In addition, the use of such commercial incinerators is now prohibited even in local towns because of the fumes such incinerators produce. Spewing fumes are also responsible for air pollution.

So far, various hot-water generators have been sold for the purpose of preparing hot water. However, they must use precious energy resources such as petroleum, gas and electric power. For the purpose of energy saving, there have been available hot-water makers harnessing solar heat as well. However, they pose a problem in that various bacteria propagate in the course of absorbing heat, some forms impermissible even to livestock.

In view of the foregoing, this invention seeks to provide a combination hot-water producer and incineration system which can prepare sterilized hot water by making effective use of both the heat of burning garbage and solar heat, dispose of garbage, whether large or small, and make that sterilized hot water drinkable.

SUMMARY OF THE INVENTION

According to one aspect of this invention, there is provided a combination sterilized hot-water producer and incineration system, comprising a hot-water generator provided with an upper tank including a heating chamber in its middle region in communication with a combustion chamber in a lower tank and a fume ducting pipe for guiding fumes from said heating chamber to the outside; an intermediate tank including a heating chamber in its middle region in communication with the combustion chamber in the lower tank; and a lower tank including said combustion chamber in its middle region and two garbage inlets, one for small garbage and the other for large garbage, said tanks being arranged such that they can communicate with one another through said heating chambers; and a sterilizer located within said heating chambers in said upper and intermediate tanks for introducing the water in said upper tank into a sterilizing chamber where it is heated to the predetermined temperature needed for sterilization.

According to another aspect of this invention, there is provided a combination sterilized hot-water producer and incineration system, comprising a hot-water generator built up from an upper tank including a heating chamber in its middle region and a fume ducting pipe for guiding fumes from said heating chamber to the outside; an intermediate tank including a heating chamber in its middle region in communication with the combustion chamber in the lower tank; and a lower tank including a heating chamber in its middle region and two garbage inlets, one for small garbage and the other for large garbage, said tanks being arranged such that they can communicate with one another through said heating chambers; a solar heat hot-water maker connected with a water supply inlet in said lower tank and located on the front side of said hot-water generator; and a sterilizing tank located within said heating chambers in said upper and intermediate tanks for introducing the water in said upper tank into the sterilizing chamber where it is heated to the predetermined temperature needed for sterilization.

BRIEF DESCRIPTION OF THE DRAWINGS

This invention will now be explained at great length but not exclusively with reference to the accompanying drawings, in which.

DETAILED EXPLANATION OF THE PREFERRED EMBODIMENTS

Figure 1:
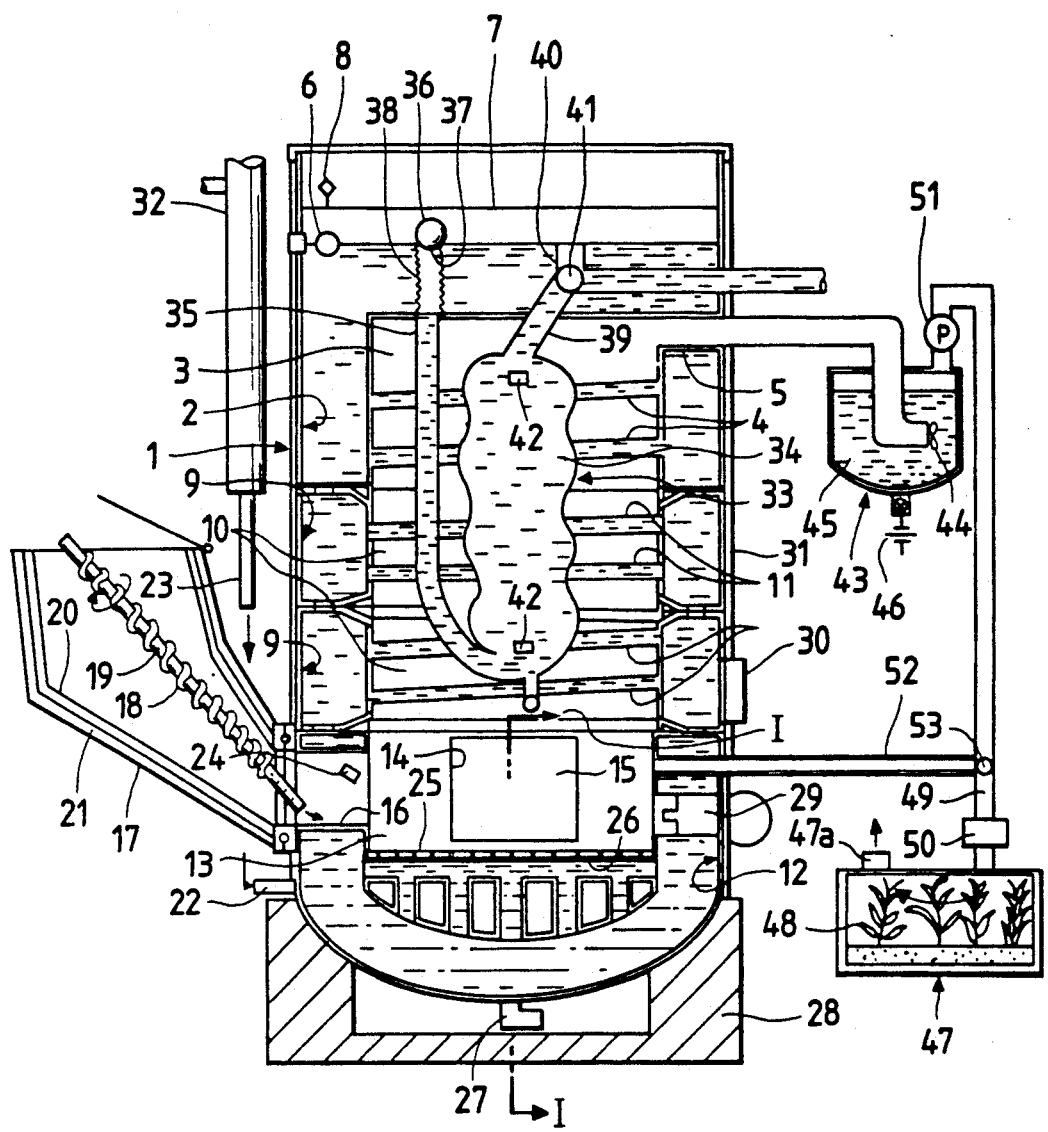
FIG. 1 is a centrally and longitudinally sectioned view of the present system.
Figure 2:
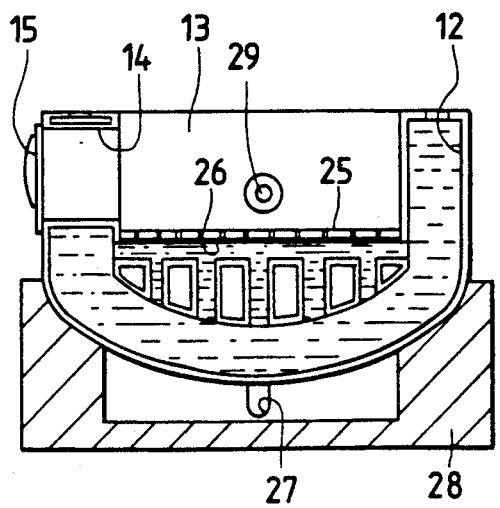
FIG. 2 is a sectional view taken along the line I—I of FIG. 1.

In FIG. 1, reference numeral 1 stands for a sterilized hot-water Generator, which is built up from upper, intermediate and lower tanks to be explained later. The upper tank, shown at 2, includes in its middle region a heating chamber 3 in communication with a combustion chamber within the lower tank to be described later. The heating chamber 3 includes a heat exchanger 4. Reference numeral 5 represents a fume ducting pipe for ducting fumes from the heating chamber 3 to the outside. A float type of valve 6 for stopping water supply from a solar heat hot-water maker is provided to supply an additional amount of fresh water, when the water level in the body 1 is lower than a predetermined level. An expansion membrane 7 is provided with an associated safety valve 8 adapted to sense the expansion of the membrane 7, thereby preventing a breakdown by expansion.

The intermediate tanks 9 include in their middle regions a heating chamber 10 in communication with the combustion chamber in the lower tank, as is the case with the upper tank 2. The heating chamber 10 again includes an heat exchanger 11. While a stack of two intermediate tanks 9 is illustrated, their number may be one, or three or more.

The lower tank 12 includes a combustion chamber 13 in its middle region, and is in operative communication with the intermediate tanks 9 and the the upper tank 2.

Reference numeral 14 stands for an inlet for large garbage such as lumber with an openable door 15, while 16 represents an inlet for small garbage, with a tiltable garbage chute 17 attached. It is noted that making the garbage chute 17 thus tiltable at any desired angle is helpful for introducing garbage more easily.

Within the garbage chute 17 there is a rotary shaft 19 which is hollow so that air can be jetted out of its extreme end, and which includes a spiral fin 18 driven by given driving means. With this arrangement, garbage can be well guided through the chute 17 to the inlet 16 by the fin 18, thereby preventing it from being clogged with small garbage and keeping air circulation such that the amount of oxygen can be increased for increased combustion. An additional fan for forced air circulation may be provided.

In addition, the garbage chute 17 includes a double-layer wall structure having inner and outer water channels 20 and 21 through which water flow alternately, whereby the water is transferred from the inner channel 20 to the outer channel 21 during combustion to prevent any drop in combustion efficiency and to protect the operator from suffering burns.

A water supply inlet 22 for supplying water to the lower tank 12 is connected with a solar heat hot-water maker, to be described later, by way of a pipe 23. An ignitor 24 is provided to cause the garbage to burn in the combustion chamber 13, and a rostle 25 is fixedly provided on an associated support 26 through which the water in the lower tank 12 flows. Dust and scale settling down on the bottom of the lower tank 12 are discharged from a port 27. The sterilized hot-water generator body 1 is supported, as shown at 28.

Reference numeral 29 stands for a petroleum burner, which is used when the Garbage to be incinerated in the combustion chamber 13 runs short or is not available at all.

Reference numeral 30 represents an electrical heater, which is used for the same purposes as stated in connection with the petroleum burner 29.

Each of the upper tank 2, intermediate tank 9 and lower tank 12 is covered on its sides and backs with an insulating material 31 to prevent heat from escaping therefrom, and the sterilized hot-water generator body 1 is provided on its front side with a solar heat hot-water maker 32 designed to heat the water supplied to the water tank by the heat of the sun while the sun shines. When the present system is used in cold districts, it is additionally provided with a sensor for measuring the temperature of the water in the solar heat hot-water maker and the ambient temperature. This temperature sensor sounds a buzzer when there is no difference between the temperature of the water and the ambient temperature or the former is lower than the latter, and so enables the present system to be covered with the insulating material manually or automatically, just like a shutter. If freezing were to occur—that is considered quite unlikely on account of combustion to take place, the water may be drained off completely.

A sterilizer 33 is provided to sterilize the hot water by heating before utilizing it. Since a temperature of 83c or higher is needed for sterilization, the hot water is guided from the upper tank 2 to the sterilizing chamber where it is sterilized and whence it is supplied for use. It is noted that a sterilizing time of 15 minutes is needed at 83° and the higher the temperature the shorter that time. The water in the sterilizing chamber is heated by the heat of combustion taking place in the combustion chamber 13.

The sterilizing chamber, shown at 34, is centrally located through the heating chambers 3 and 10 of the upper tank 2 and intermediate tank 9 via the heat exchangers 4 and 11, and a water conductor 35 has one end connected with the bottom of the sterilizing chamber 34 and the other end extending from the top wall of the heating chamber 3 in the upper tank 2. The extension of the conductor 35 is connected at its extreme end with a flexible water conductor 38 with its water inlet 37 being constantly located on the water level by a float 36.

A hot-water supply pipe 39 is connected at one end with the top of the sterilizing chamber 34 and extends at the other end from the top wall of the heating chamber 3 in the upper tank 2 to the outside thereof. An air-bubble discharge pipe 40 is connected with the hot-water supply pipe 39 on its intermediate length, and a flow passage changeover valve 41 is located on the junction with the air-bubble discharge pipe 40, whereby air bubbles can be discharged from within the sterilizing chamber 34 through the air-bubble discharge pipe 40 except when hot water is being supplied.

Water temperature sensors 42 and 42 are provided to detect the temperature of the hot water in the sterilizing chamber 34, thereby actuating the ignitor when the water temperature detected is lower than the predetermined temperature. As already mentioned, the sterilizing time should be 15 minutes at 83° C. The higher the temperature, the shorter the sterilizing time, and the water temperature sensors 42 and 42 serve to determine the sterilizing time.

A fume removing tank 43 is provided to prevent fumes generated during combustion from being spewed directly to the atmosphere. A stirring fan 44 is provided to stir a water 45 into which the fumes are discharged for dissolution. It is noted that the fume ducting pipe 5 has its open end terminating in the water in the fume removing tank 43. A union 46 is provided on the bottom of the fume removing tank 43 to remove soot settling down thereon.

An oxygen reducing tank 47 having plants or trees 48 planted therein is provided to reduce exhaust gases leaving the fume removing tank 43 to oxygen, which is then released into the atmosphere through an oxygen release port 47a. The oxygen reducing tank 47 is connected with the fume removing tank 43 by way of a pipe 49.

A deodorizer 50 is mounted intermediate the length of the connecting pipe 49, and 51 represents a pump.

A pipe 52 has one end connected with the pipe 49 intermediate its length and the other end connected with the combustion chamber 13, with their junction having a flow passage changeover valve 53.

With garbage fed through the garbage inlet 14 or 16 and ignited, it burns in the combustion chamber 13 and generates heat with which the water in the upper, intermediate and lower tanks 2, 9 and 12 are heated. In addition, the water is heated by the solar heat hot-water maker 32. The hot-water in the upper tank 2 i s passed through the sterilizing chamber 34, during which it is sterilized.

On the other hand, fumes generated during combustion flow into the fume ducting pipe 5 through the heating chambers 10 and 3 in the intermediate and upper tanks 9 and 2, and released into the water in the fume removing tank 43, where the fumes are dissolved in the water for removing soot. Carbon dioxide leaving the fume removing tank 43 is reduced to oxygen in the oxygen reducing tank 47, which is then released into the atmosphere. While combustion is forcedly interrupted when the interior temperature of the combustion chamber reaches a predetermined temperature, the fumes generated at that time are guided by the flow passage changeover valve 53 and repeatedly circulated in a closed loop defined by the heating chambers 10, 3, fume removing tank 43 and pipe 52 for removal by pump 51, during which any fresh air is not fed into the combustion chambers.

According to this invention constructed and operated as mentioned above, it is possible to make hot water by making effective use of both the heat of burning garbage by incineration and solar heat. Thus, the present system is much more economical than conventional hot-water making systems using petroleum, power, etc. and so contributes to energy saving. It is also possible to efficiently incinerate garbage, whether small or large, because the present system includes two inlets for large- and small-forms of garbage. In addition, it is possible to prevent sizes air pollution, because the present system is unlikely to spew fumes directly into the atmosphere. The hot water obtained by the present system, because of being sterilized, can be used as drinking water.

What is claimed is:

1. A combination sterilized hot-water producer and incineration system comprising;

a combustion zone having an upper portion and a lower portion;

combustion means disposed in said lower portion of said combustion zone;

garbage feed means in communication with the lower portion of said combustion zone;

water feed means;

water tank means completely surrounding said combustion zone, said water tank means including an upper tank, an intermediate tank and a lower tank in communication with each other, said combustion zone being surrounded by water within said upper, intermediate and lower tanks, said water tank means including a water supply inlet in communication with said water feed means, and a heat exchange means to heat with heat from said combustion zone water in said water tank means, said heat exchange means including a plurality of tubes in communication with said water tank means, said plurality of tubes passing through the upper portion of said combustion zone;

water sterilizer means disposed in the interior of said intermediate and upper tanks and said heat exchange means, said water sterilizer means including a sterilizing chamber having a inlet means and an outlet means, said inlet means positioned in said upper portion of said combustion zone and in communication with said upper tank in said water tank means to permit water in said upper tank above said combustion zone to pass into said sterilizing means, said outlet means permitting water having been sterilized in said sterilizing chamber to be removed from the system;

outlet means for combustion zone gases in communication with said upper portion of said combustion zone, said outlet means terminating within a body of water in an exhaust gas purifying means;

means to remove purified exhaust gas from said purifying means; and means to reduce carbon dioxide in the removed purified exhaust gas to remove oxygen therefrom.

2. The system of claim 1 wherein said means to transform carbon dioxide to oxygen comprises an oxygen reducing tank containing one or more plants and means to direct purified exhaust gas from said purifier means to said oxygen reducing tank.

3. The system of claim 1 further including means to selectively recover gas or water from said outlet of said water sterilizer means.

4. The system of claim 1 further comprising solar heating means disposed between said water feed means and said water supply inlet to said water tank means to preheat water supplied to said water tank means.

* * * * *